(12) United States Patent
Geng et al.

(10) Patent No.: US 11,899,232 B2
(45) Date of Patent: Feb. 13, 2024

(54) FABRICATION AND USE OF ALL-OPTICAL-FIBER POLARIZER

(71) Applicant: AdValue Photonics, Inc., Tucson, AZ (US)

(72) Inventors: Jihong Geng, Tucson, AZ (US); Shibin Jiang, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 0 days.

(21) Appl. No.: 17/833,347

(22) Filed: Jun. 6, 2022

(65) Prior Publication Data

US 2023/0393318 A1    Dec. 7, 2023

(51) Int. Cl.
*G02B 5/30* (2006.01)
*G02B 6/42* (2006.01)

(52) U.S. Cl.
CPC ......... *G02B 5/3025* (2013.01); *G02B 6/4209* (2013.01)

(58) Field of Classification Search
CPC ............................ G02B 5/3025; G02B 6/4209
USPC ........................................................ 385/24
See application file for complete search history.

(56) References Cited

U.S. PATENT DOCUMENTS

| | | | | |
|---|---|---|---|---|
| 5,224,977 A | * | 7/1993 | Anjan | G02B 6/2843 65/378 |
| 5,479,546 A | * | 12/1995 | Dumais | G02B 6/2552 385/27 |
| 6,701,046 B1 | * | 3/2004 | Pianciola | G02B 6/2835 385/11 |
| 2003/0031415 A1 | * | 2/2003 | Gonthier | G02B 6/2773 385/11 |
| 2020/0033188 A1 | * | 1/2020 | Hidaka | G01M 11/02 |
| 2022/0291461 A1 | * | 9/2022 | Elsinger | G02B 6/124 |
| 2023/0213703 A1 | * | 7/2023 | Nesic | G02B 6/262 385/24 |

FOREIGN PATENT DOCUMENTS

CN    110687092 A  *  1/2020  ............. G01N 21/01

* cited by examiner

*Primary Examiner* — Jerry M Blevins
(74) *Attorney, Agent, or Firm* — Quarles & Brady LLP; Yakov S. Sidorin

(57) ABSTRACT

Method for fabricating of all-optical-fiber based optical polarizer devoid of fusing of first and second optical fibers. The method includes a process of forming a substantially adiabatic optical fiber taper by pulling an optical fiber and interrupting this process when an optical power parameter measured at an output of the optical fiber is reduced below a pre-defined threshold as a result of said pulling. An optically-tapered single-mode polarization-maintaining optical fiber element fabricated according to the method and configured as such all-optical-fiber polarizer.

14 Claims, 6 Drawing Sheets

FABRICATION AND USE OF ALL-OPTICAL-FIBER POLARIZER

STATEMENT REGARDING FEDERALLY SPONSORED RESEARCH OR DEVELOPMENT

This invention was made with government support under contract number FA8650-18-C-5077 awarded by Department of Defense. The government has certain rights in the invention.

TECHNICAL FIELD

The present invention relates to optical polarizers and, more particularly, to optical polarizers configured with the use of only optical fibers.

RELATED ART

Optical polarizers (or polarizers, for short) are known as optical filter components configured to let light waves in a particular specific polarization state pass through while blocking or at least attenuating (preferably, with a high extinction ratio) light waves in a different polarization state (and, in some specific cases, as optical devices that convert unpolarized light into one that is appreciably polarized in some form). Polarizers have been widely used in many optical components and systems, for example in building optical isolators and circulators, and remain necessary optical constituents for building various laser systems.

Light-polarizing components are widely used in fiber-optic-based systems (for example, fiber lasers and fiber-based telecon networks) and often have to be structured with the use of a bulk optical component (for example, utilize a bulk optical polarizer) because the light-polarizing function cannot be readily implemented in an optical fiber. In this case, polarizers are typically fiber-pigtailed in order to be integrated with other fiber optic components. For example, early attempts relied on the use of compound semiconductors or naturally birefringent materials such as LiNbO₃ to provide discrimination between the two polarization states, but these fiber-pigtailed polarizers are complex and difficult to fabricate. Indeed, in practice it remains difficult to align optical axes between the constituent components used in a given system—for example, between that of an optical fiber element of the system and that of a bulk polarizer.

FIG. 1 schematically illustrates an example of the use of bulk micro-optics utilizing approach, which is probably known the most and the widely used methodology of introducing an optical polarizer in the otherwise optical-fiber system. According to this approach, a bulk-optical-component polarizer 110 is employed for polarization control and free-space optical coupling is used to couple light to a pigtailed optical fiber 120. Because of the existence of free-space fiber coupling at the input and output, this type of fiber polarizers are known to be operationally vulnerable when the input light has high power/intensity. The maximum handling power of light is typically limited to 1 Watt or so. Even notwithstanding the practical difficulties of optical alignment, the use of bulk optic polarizing arrangements is inevitably accompanied with high cost, lack of mechanical and thermal stability, and substantially high optical losses that cannot be neglected: the disadvantages of such hybrid systems include their lack of physical robustness and the optical loss associated with coupling optical power from a fiber into a bulk component and back again.

FIG. 2 schematically illustrates the use of an evanescent field approach, according to one implementation of which a piece of optical fiber 220 is side-polished (such that a portion of the cladding is polished away) and replaced by some other materials 210 (for example, a metallic thin film or semiconductor-doped glass thin film, or a piece of birefringent crystal or liquid crystal). In the resulting construct, as shown, the evanescent field of light propagating through the fiber 220 interacts with the material(s) 210 differently depending on the polarization of light (TE and TM modes) and the optical wavelength, leading to some polarizing capability. Understandably, this kind of fiber-based polarizer component remains difficult to fabricate, and it inherently cannot handle high-level optical power throughputs.

Initial attempts to utilize all-fiber polarizer (that is, a light polarizing device or component that uses exclusively fiber-optics) showed some promise. For example, design and fabrication of special types of fiber Bragg gratings configured for filtering out one pre-defined polarization component while keeping the other (orthogonally-polarized) component of light transmitted through the fiber (see, for example, K. Zhou et al., "High extinction ratio in-fiber polarizer based on a 45°-tilted fiber Bragg grating," in Optical Fiber Communication Conference and Exposition and The National Fiber Optic Engineers Conference, Technical Digest (CD); Optical Society of America, 2005, paper OME22). However—and despite the fact that this specific use of the tilted fiber Bragg gratings has been commercialized—this technology continues to exhibit from losses that are relatively heigh (an insertion loss specification at <2 dB) resulting in limitations imposed on such devices in a form of more than moderate power handing capability (specified at several Watts, at most).

Another approach to structuring an all-fiber polarizer was proposed to be based on a fused fiber coupler (made from two single-mode fiber optic pieces or component with biconical tapering) that is currently used for the development of all-fiber isolators offering >20 dB of optical isolation and <0.3 dB of insertion loss, with a maximum power handling of >200 W. For polarizers implemented using this technology, the narrow operation bandwidth (typically, less than 5 nm) remains the operational drawback.

Yet another demonstrated all-fiber polarizer contraption employed a polarizing fiber specifically designed to possess different propagation losses for the light in different states of polarization. Although such custom multiple-meter-long polarizing fiber may offer high polarization-extinction ratio, reasonably low loss figure, broad spectral bandwidth, and practically good stability over temperature—and even such polarizers do offer these operational characteristics—it is necessary for such a fiber device to be sufficiently long (on the order of several meters) in order to achieve a useful target value of polarizing efficiency. (Typically, however, the performance of such devices is still associated at least with modal transformations, and undesirable optical losses.) As a person of skill will readily appreciate, the need in long fiber lengths of such currently-existing all-fiber polarizer practically prevents these devices from being used in applications associated with high power lasers (at least due to the concern of nonlinear optical effects caused upon propagation of high power light through such fiber devices).

Overall, to date, the search for reliable and operationally-satisfying methodology of fabricating all-optical-fiber-based light polarizing components (that is, polarizers configured with the use of exclusively optical fibers) that is free from the shortcomings of the existing technologies is not over.

SUMMARY OF THE INVENTION

Embodiments of the invention provide a method for fabricating of an all-optical-fiber polarizer. The method includes a step (performed during the process of formation of a substantially adiabatic optical fiber taper by pulling a single-mode polarization-maintaining optical fiber, SMPMF, element), which step is launching into the SMPMF element first light with a first linear polarization substantially aligned along a slow axis of the SMPMF element and second light with a second linear polarization substantially aligned along a fast axis of the SMPMF element to form first and second fundamental spatial fiber modes propagating in a fiber core of the SMPMF element. The method further includes interrupting the process of forming the adiabatic optical fiber when an optical power parameter (measured at an output of the SMPMF element) is reduced below a pre-defined threshold as a result of such pulling, to form an optically-tapered SMPMF element configured as said all-optical-fiber polarizer. In at least one specific case, the method does not include using an optical fiber that contains fused together different optical fiber pieces and/or does not include fusing first and second pieces of an optical fiber. In at least one implementation, the method may include, additionally or in the alternative, spatially separating—during the pulling of the SMPMF element and at the output of the SMPMF—first and second portions of output light transmitted through the SMPMF element and having the first and second linear polarizations; and, with the use of respectively-corresponding first and second optical detection systems, spatially-independently monitoring first and second optical powers in the first and second portion of the output light. Here, the interrupting includes ceasing the pulling when one of the first and second optical powers is reduced below the pre-defined threshold.

Alternatively or in addition, the method may be configured such that one of the first and second optical powers is an optical power representing an optical fiber mode propagating in a cladding of the SMPMF element; and/or the interrupting may include ceasing the pulling at a moment when one of the first and second optical powers is reduced below the pre-defined threshold while the other of the first and second optical powers remains above the pre-defined threshold. (Alternatively or in addition, and substantially in every implementation of the method, the interrupting may include ceasing the pulling at a moment when one of the first and second optical powers is reduced below the pre-defined threshold while the other of the first and second optical powers remains above the pre-defined threshold.) In at least one implementation of the method, the launching may include transmitting a first light output of a first laser light source through a first input SMPMF component that has a slow axis of the first input SMPMF component substantially-aligned, respectively, with the slow axis of the SMPMF element while transmitting a second light output of a second laser light source through a second input SMPMF component that has a fast axis of the second input SMPMF component substantially-aligned, respectively, with the fast axis of the SMPMF element. When the process of spatially-separating includes transmitting the output light through an output SMPMF component, such transmitting may be effectuated through a first auxiliary optical fiber and a second auxiliary optical fiber towards a first optical detector and a second optical detector, respectively.

Embodiments additionally provide a method for aligning a polarization vector of light propagating through an all-optical-fiber system with a pre-determined axis. Such method includes a) transmitting first light through the all optical-fiber system, in which the all-optical-fiber polarizer (fabricated according to any embodiments of the fabrication method identified above) has been inserted between and fused directly with first and second all-optical-fiber devices of the all-optical-fiber system (here, one of the slow and fast axes of the all-optical-fiber polarizer defines the pre-determined axis) and b) maximizing optical throughput produced by such first light at an output of the all-optical-fiber system.

BRIEF DESCRIPTION OF THE DRAWINGS

The invention will be more fully understood by referring to the following Detailed Description of Specific Embodiments in conjunction with the Drawings, of which.

Generally, like elements or components in different Drawings may be referenced by like numerals or labels and/or the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

While the development of all-fiber optical components that mimic the performance and/or functionality of traditional bulk optical components has been around for a while (optical fiber Bragg gratings, configured to operate as optical reflectors and/or wavelength-dependent optical spectral filters, provide but one example of such successful development), the methodology of fabrication of an operationally appropriate optical polarizer as an all-fiber device remains elusive and challenging. In high power fiber-laser applications, for example, it is required that all fiber components be robustly operational at high power levels. A fiber isolator, for example (that includes an input/output fiber polarizer and a Faraday rotator) is a key component of almost every fiber laser system, including high power fiber lasers configured to be operated at hundreds or thousands of Watts of optical power. To build a high-power fiber isolator, the appropriate all-fiber polarizer configured to handle the corresponding high levels of optical power is needed.

Figure 1:
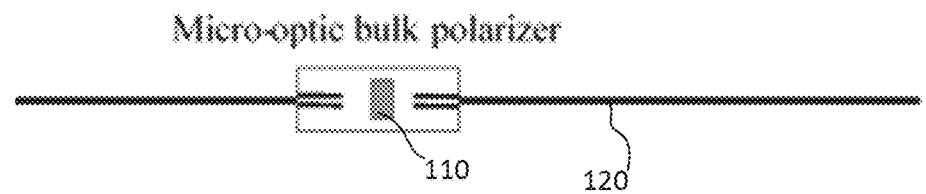
FIGS. 1 and 2 provide schematic illustrations of embodiments of the fiber-based optical polarizers of related art that employ a combination of an optical fiber and a non-optical-fiber components.
Figure 2:
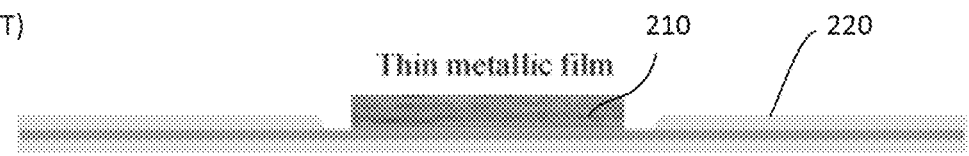
Figure 3:
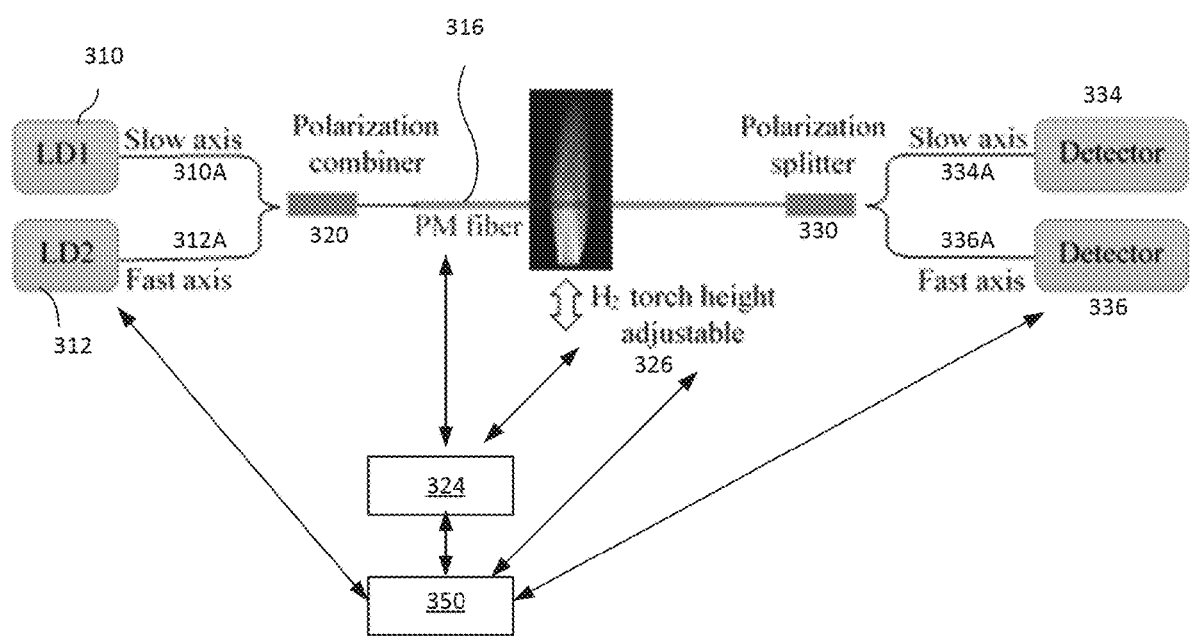
FIG. 3 illustrates an embodiment of a process of fabrication of an all-fiber optical polarizer according to the idea of the invention.

In accordance with the idea of the invention, methods and apparatus are disclosed for an all-optical-fiber optical polarizer formed with the use of a single, one polarization-maintaining (PM) fiber taper. Accordingly, at least one embodiment of the invention represents a monolithic fiber-optic device devoid of a fusing boundary between two initial pieces of optical fiber. FIG. 3 schematically illustrates the methodology of fabrication of such all-fiber polarizer.

As shown, and according to the idea of the invention, two substantially operationally-similar DFB laser diode sources operating at substantially the same wavelength (with possible spectral difference between the operational wavelengths of about 1 nm or smaller than that) are used, with one (shown as 310) being spatially oriented such that the polarization vector of its optical output is aligned with the slow axis of its corresponding polarization-maintaining (PM) output fiber 310A, while the other laser diode source (shown as 312) is oriented such that the polarization vector of its optical output is aligned with the fast axis of the corresponding PM output fiber 312A. The respectively-corresponding laser outputs are then combined and coupled into the same, single, the only piece of PM fiber 316 with the use of, for example, one fiber-based polarization combiner 320. (In a related implementation, understandably, one DBF laser diode can be used, the light output from which is spatially split into to different optical paths), The PM fiber 316, while carrying/channeling the two combined radiative outputs from the fibers 310A, 312A remains under fabrication investigation in a judiciously fiber-taper pulling process, as discussed below. Such fiber pulling process was performed by using a commercial fiber-coupler workstation 324 cooperated with a hydrogen flame system 326. The operation of the station/flame station was computer-controlled (the corresponding microcontroller/electronic circuitry is denoted as 350) with respect various software-accessible parameters, including for example a speed of pulling the fiber 316, dynamics of flame scanning with respect to the fiber 316, $H_2/O_2$ gas pressure and flowing rates, and height of the hydrogen torch, to name just a few. During the fiber pulling process, the laser light portions acquired from the fiber outputs 310A, 312A and transmitted respectively along slow-axis and fast-axis of the fiber 316 were separated, at the output of the fiber 316, by another fiber-based polarization combiner/splitter component 330 into two different light-propagating channels (shown in this specific embodiment as the respectively-corresponding PM-fiber optical channels 334A, 336A) and then simultaneously delivered to and monitored by two substantially identical optical power detectors 334, 336. The programmable computer processor/microprocessor 250 may be used for controlling the operation of the process of fiber pulling, the operation of the laser source(s) and the optical detection system(s), as well as spatial orientation of the polarization vector(s) of various portions of used light with corresponding optical fiber elements, as appropriate.

Depending on the regime of taper fabrication—adiabatic or non-adiabatic—the evolution of light propagating through the fiber 316 is different. (For the purposes of this disclosure, during the formation of the optical fiber taper in adiabatic regime, the fiber taper angle is smaller than a critical angle for light propagating within the fiber, as defined by the local fiber taper geometry. The critical angle, as understood in related art, is the angle of incidence of light onto a dielectic boundary above which total internal reflection occurs.)

Figures 4A, 4B:
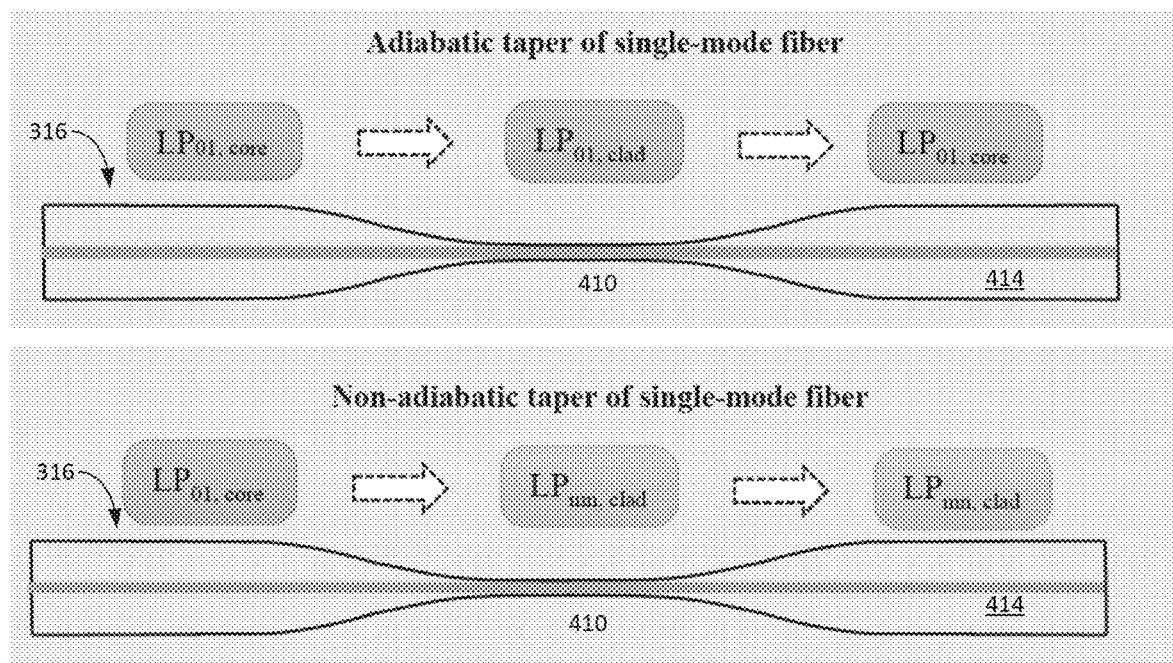
FIGS. 4A, 4B schematically illustrate evolution of optical waveguide modes in a single-mode fiber taper formed in the subject-to-pulling PM optical fiber in an adiabatic regime (FIG. 4A) and non-adiabatic regime (FIG. 4B).

FIGS. 4A, 4B illustrates waveguide mode evolution of such light propagating in the single-mode fiber 316 when a section 410 of fiber is experiencing pulling/formation of fiber taper in these two different regimes. In a single-mode fiber, the light is propagating in single fundamental mode inside the fiber core; denoted as $LP_{01, core}$. Typically, during the process of tapering the fiber down, the fiber core at some point may become too small to guide the single-mode light in the fiber core, and the channeled light then escapes outwardly from the spatially-squeezed by the tapering process fiber core and starts propagating in the cladding of the same fiber.

Accordingly, if the single-mode fiber taper in the fiber 316 is fabricated in an adiabatic regime, the channeled light substantially maintains being transmitted in the single-mode regime (that is, substantially no high-order spatial mode is being excited) in the fiber cladding at the region 410 of the fiber subject to tapering; such single mode is denoted as a single-mode cladding mode $LP_{01, clad}$ (FIG. 4A) However, if the single-mode fiber taper is fabricated in a non-adiabatic regime as shown in FIG. 4B (that is, with an angle of the fiber taper being larger than the critical angle for light propagating within the fiber taper, which is approximately the ratio of fiber radius to the local fiber taper length), high-order cladding modes (which are denoted as $LP_{mn, clad}$) can be excited when the light starts propagating in the fiber cladding. As a result of non-adiabatic tapering, therefore, the optical energy is converted from the single-mode core mode $LP_{01, core}$ to high-order cladding modes, $LP_{mn, clad}$, and substantially no light remains propagating in the fiber core in the portion 430 of the fiber that follow the fiber taper region 410.

A skilled person knows that, according to the waveguide mode coupling theory, efficient mode coupling between two different spatial fiber modes can occur only when these modes have nearly equal propagation constants, so that the phases of optical waves in the two modes are substantially matched. The propagation constant, $\beta$, is given by $\beta=2\pi n/\lambda$. Since the refractive index in the fiber core is higher than that in the fiber cladding, the propagation constants of the core modes are larger than those of the cladding modes, and low-order modes have larger propagation constants than high-order modes.

Figure 5:
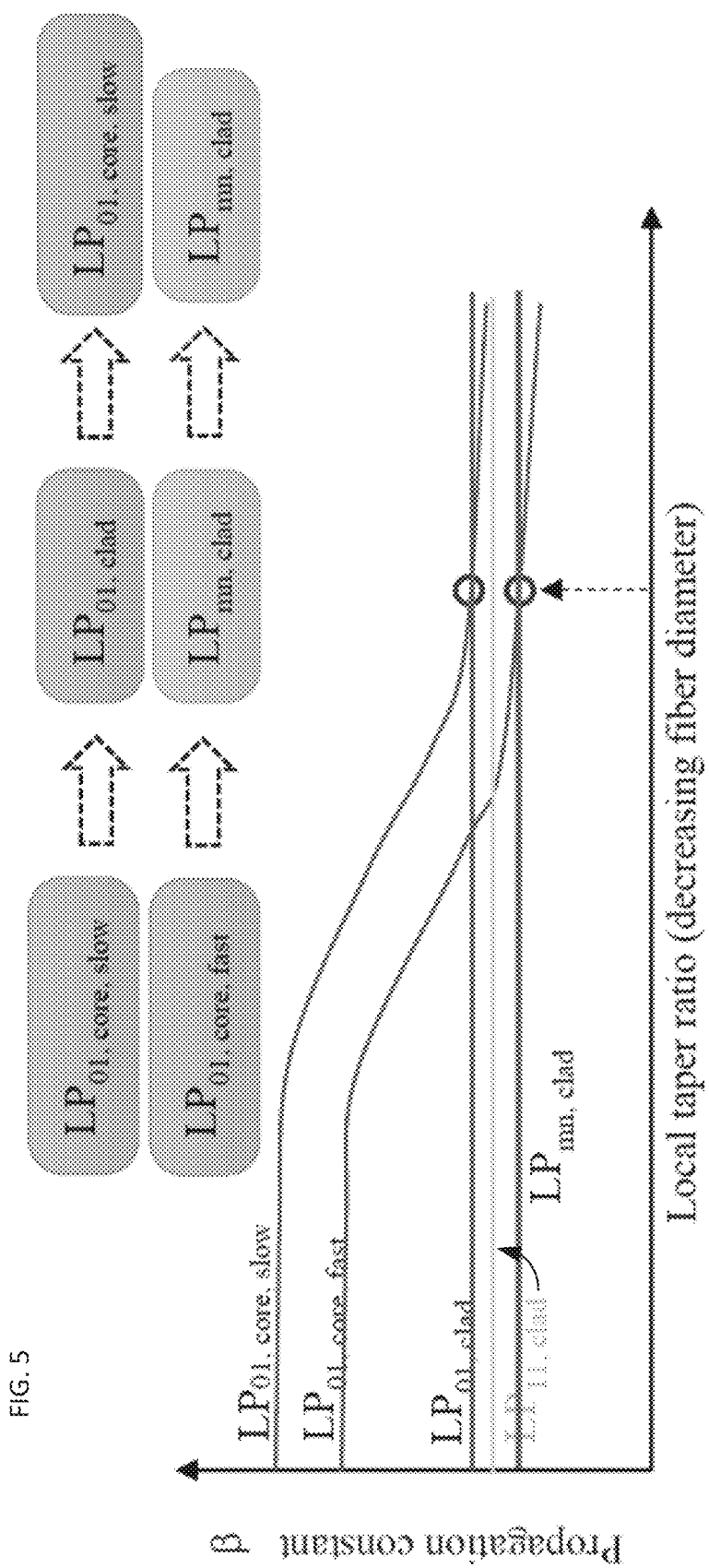
FIG. 5 schematically illustrates an embodiment of the method for fabricating an all-fiber optical polarizer during the process of forming a fiber taper. Here, propagation constants R of core modes and cladding modes of the fiber and variations of these constants as a function of the local taper ratio facilitate the preferential transmission of the mode with chosen polarization through the taper region when a pre-defined taper ratio is reached.
Figure 6:
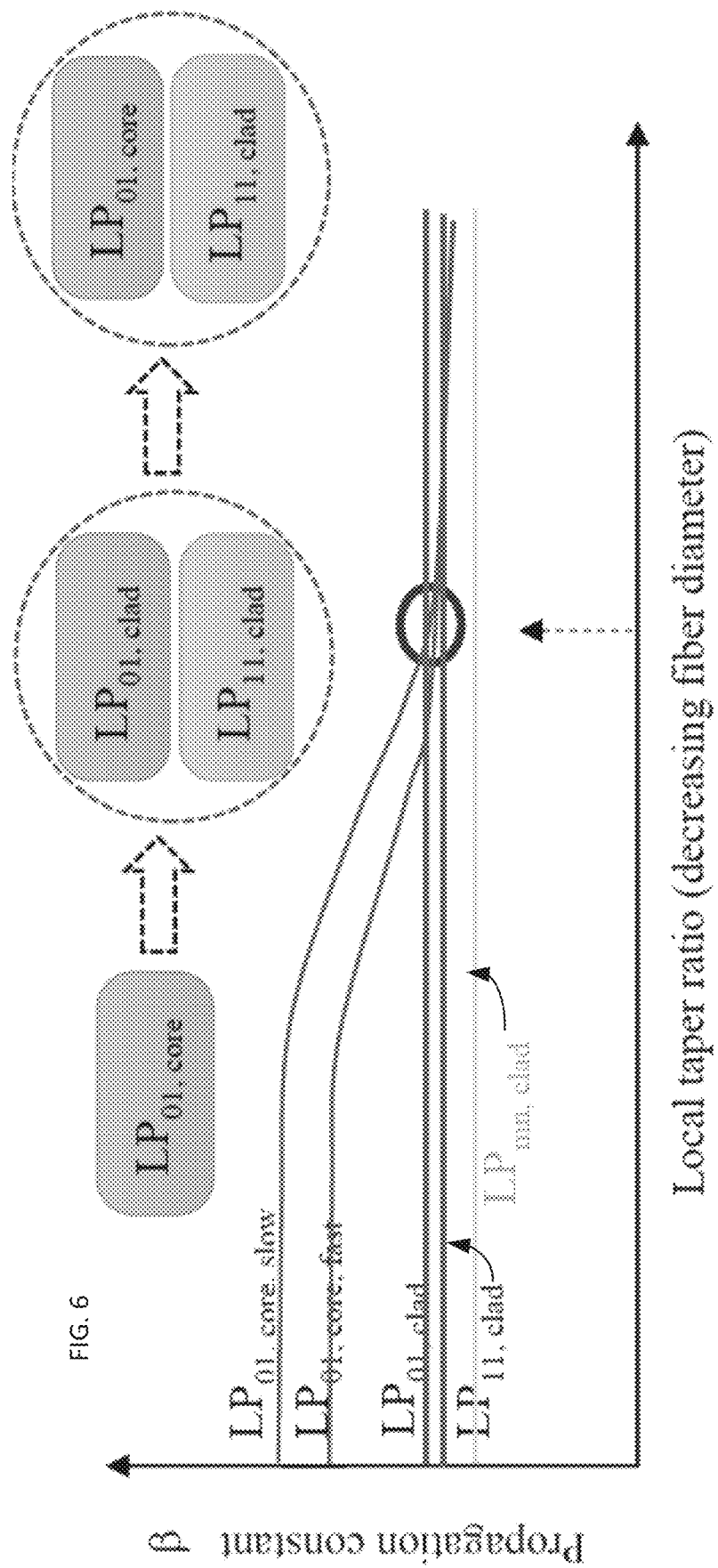
FIG. 6 provides an illustration to a related embodiment of the invention. Here, propagation constants $\beta$ of core modes and cladding modes of light propagating through the fiber subject to formation of the fiber taper—as well as variations of these constants as a function of the local taper facilitate optical coupling between the fundamental cladding mode ($LP_{01, clad}$) and the $1^{st}$-order high-order mode ($LP_{11, clad}$) for light channeled by the fiber in both the polarization state in which the polarization vector substantially coincides with the slow-axis of the PM fiber and the polarization state in which the polarization vector substantially coincides with the fast-axis of the fiber.

For single-mode polarization-maintaining fiber such as fiber 316, due to the birefringence with the refractive index having different values for the slow- and fast axes, the single-mode propagation constant is, understandably, polarization-dependent. The fiber mode polarized along the slow axis of the fiber 316 has a larger propagation constant than the mode polarized along fast axis of the fiber 316. FIGS. 5 and 6 provide illustrations to two scenarios of mode coupling in a single-piece of PM fiber 316 during the fiber tapering process that is conducted in a special non-adiabatic regime (FIG. 4B).

FIG. 5 illustrates the scenario observed during the fabrication of the fiber taper for operation in a 1 μm wavelength band in an Nufern PM680 fiber. When tapering a single-piece of the PM680 fiber by using carefully-selected parameters for fiber tapering process (such as, for example, parameters of fiber pulling speed and temperature distribution along the fiber, and their dynamioc variation during the fober-taper pulling process), an adiabatic tapering regime was achieved for a single mode 1 μm operation with a polarization vector of light aligned with the slow axis of the optical fiber, while a non-adiabatic tapering regime was present for the same operation with polarization vector directed along the fast axis of this PM-fiber. As a result, the light propagating in the form of a single spatial mode with the polarization along the slow axis was exhibiting a low-loss transmission through the PM fiber taper section of the fiber, while the transmission of light in the single spatial mode with the polarization vector along the fast axis of the fiber could was substantially attenuated (in experiment, such light effectively did not pass through the PM fiber taper region of the fiber).

Instead, it was observed that the fast-axis-aligned light experienced excitation into a high-order mode and mode conversion from the $LP_{01, core}$, fast mode to the $LP_{mn, clad}$ mode. It was found that different propagation constants for single-mode laser light polarized along the slow axis and the fast axis of the fiber, as well as variations/changes of such constants with the local taper ratio (defined as a ratio of the original fiber to the minimum diameter of the fiber in the tapered region) determine how these light modes were coupled with the cladding modes in the PM fiber taper. Under a specific condition (fiber taper ratio with a pulling length between 5 and 15 mm over a small section of a 125 micron cladding-diameter polarization maintaining fiber), as illustrated with circles in the graphs of FIG. 5, where $\beta(LP_{01,core,slow})=\beta(LP_{01,clad})$ and $\beta(LP_{01,core,fast})=\beta(LP_{mn,clad})$, the PM fiber taper region 410 of the fiber 316 is configured as an optical polarizer, and has low loss in slow axis and high loss in fast axis in the PM fiber core.

FIG. 6 illustrates a related implementation of the idea of the invention carried out while tapering (in a fashion referred to in FIGS. 4A, 4B) a Liekki PM10/125 um fiber to configure the taper for the 1 μm wavelength band operation. When tapering Liekki PM10/125 um fiber by using carefully-selected parameters for fiber tapering process (which parameters include, as mentioned above, fiber pulling speed and temperature distribution along the fiber, and their dynamioc variation during the fober-taper pulling process), such non-adiabatic tapering regime was achieved that operationally was close to an adiabatic tapering regime. In this case, strong mode coupling between the fundamental cladding mode ($LP_{01, clad}$) and the 1$^{st}$-order high-order mode ($LP_{11, clad}$) resulted for both the portion of light with polarization along the slow-axis of the fiber and that with polarization along the fast-axis of the fiber. (This coupling was arrived at when the propagation constants of these modes were changed due to the tapering process to assume values that were substantially equal to one another, as illustrated with circles in the graph of FIG. 6.) As a result, spatially-periodic energy exchanges occurred and were observed between the fundamental cladding mode ($LP_{01, clad}$) and the 1$^{st}$-order high-order mode ($LP_{11, clad}$) for both slow-axis-polarized and fast-axis-polarized portions of light propagating through the tapered fiber. Due to a small difference in propagation constants for light portions with the specified polarization states, a periodic energy oscillation between the fundamental cladding mode ($LP_{01, clad}$) and the 1$^{st}$-order high-order mode ($LP_{11, clad}$) has a different oscillating phase for different polarization components of light. When the pulling length of $L_1$ of such a PM fiber taper is reached at a certain point in the process, slow-axis-polarized light and fast-axis-polarized light are out of phase (in terms of energy exchange with the 1$^{st}$-order high-order mode $LP_{11, clad}$) thereby allowing for not only low-loss transmission of light in one these two polarization states and high-loss transmission for light with the orthogonal polarization with a extinction ratio typically exceeding that of 15 to 20 dB, but also for an expanded spectral bandwidth, as shown below. At this moment, the tapered PM fiber performed as an optical polarizer. Similar results were observed with Nufern PM980 and PM1550 optical fibers as well.

Figure 7:
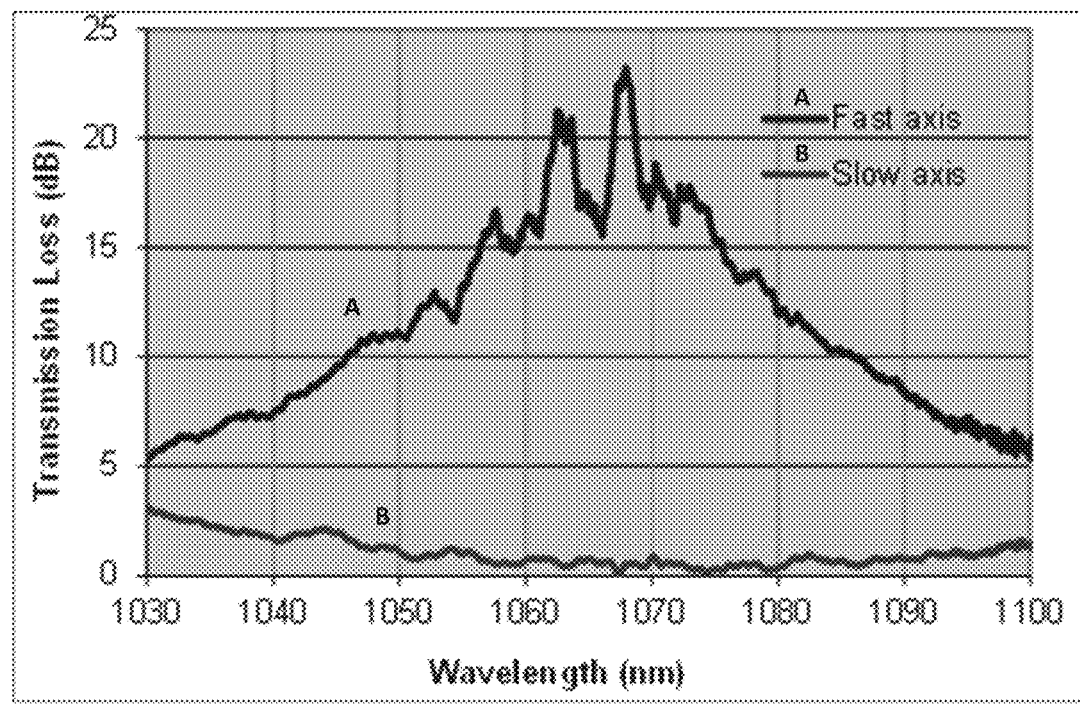
FIG. 7 provides plots of transmission spectra of an PM fiber taper-based polarizer fabricated for operation in a one-micron wavelength band and measured with a linearly-polarized broadband light source (an Yb-doped fiber ASE source) along the slow-axis and the fast-axis of the fiber, respectively.
Figure 8:
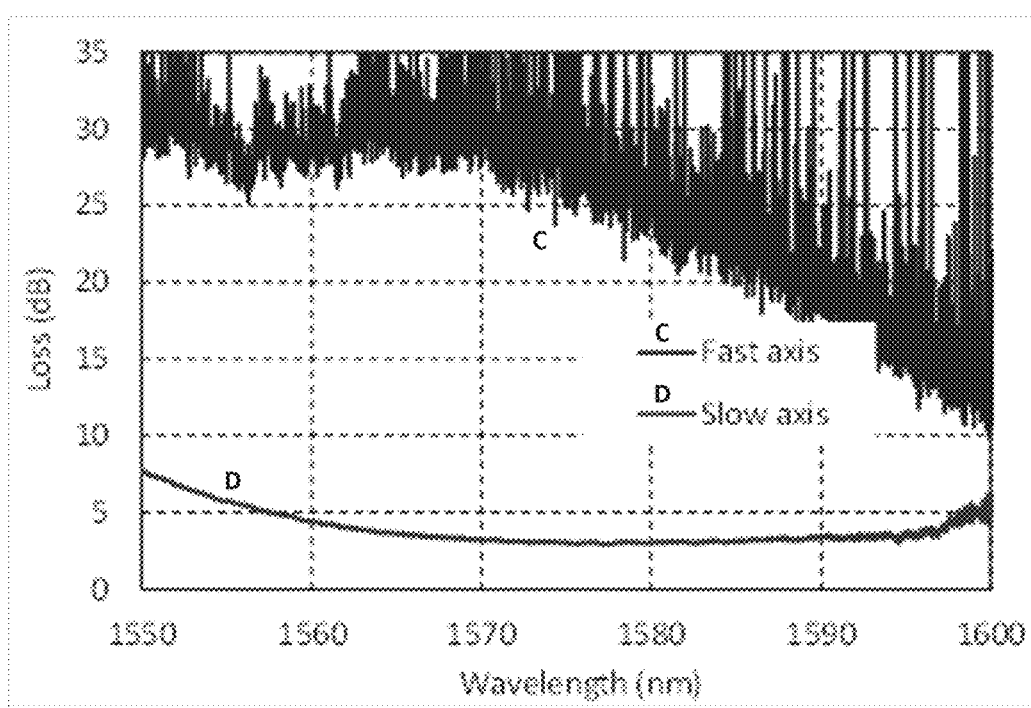
FIG. 8 illustrates plots of transmission spectra of an PM fiber taper-based polarizer fabricated for operation in a 1.55 micron wavelength band and measured with a linearly-polarized broadband light source (an Er-doped fiber ASE source) along the slow-axis and the fast axis of the fiber, respectively.

In related embodiments, the substantially same manufacturing approach can be used for formation of a PM fiber taper-based polarizers for different wavelength bands. FIGS. 7 and 8, for example, show optical performance of two typical PM fiber taper-based polarizers fabricated for 1 μm wavelength band and 1.55 μm wavelength band, each demonstrating very high suppression of light polarized along the slow axis (curve B in FIG. 7 and curve D in FIG. 8) and the spectral bandwidth for practically acceptable transmission loss of light polarized along the fast axis (curve A of FIG. 7 and curve C of FIG. 8) exceeding 10 nm (as compared with a typical value of about 1 nm for a polarized fabricated with the use of fusing two fiber optic components).

While the discussion above and/or used illustrations do not necessarily identify methods of controlling the disclosed process of fabrication of an embodiment of the invention, it is appreciated that implementation of an embodiment may include the use of a processor controlled by instructions stored in a memory that is operably cooperated at least with the electro-mechanical system subjecting the fiber-at-hand (the fiber being tapered) to pulling and/or heating the fiber during the process of manufacturing an embodiment of the invention. The memory may be random access memory (RAM), read-only memory (ROM), flash memory or any other memory, or combination thereof, suitable for storing control software or other instructions and data. Those skilled in the art should also readily appreciate that instructions or programs defining the functions of the operation of a (computer) processor employed in an embodiment of the present invention may be delivered to the processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, the following disclosure may describe features of the invention with reference to corresponding drawings, in which like numbers represent the same or similar elements wherever possible. In the drawings, the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. The use of this term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated may vary within a range defined by an experimental measurement error that is typical when using a measurement method accepted in the art for such purposes. For example, a reference to a vector or line or plane being substantially parallel to a reference line or plane is to be construed as such vector or line extending along a direction or axis that is the same as or very close to that of the reference line or plane (with angular deviations from the reference direction or axis that are considered to be practically typical in the art, for example between zero and fifteen degrees, more preferably between zero and ten degrees, even more preferably between zero and 5 degrees, and most preferably between zero and 2 degrees). For example, the terms "approximately" and about", when used in reference to a numerical value, represent a range of plus or minus 20% with respect to the specified value, more preferably plus or minus 10%, even more preferably plus or minus 5%, most preferably plus or minus 2%.

While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention as recited in claims appended to this disclosure is intended to be assessed in light of the disclosure as a whole.

What is claimed is:

1. A method for fabricating an all-optical-fiber polarizer, the method comprising:
    while forming a substantially adiabatic optical fiber taper by pulling a single-mode polarization-maintaining optical fiber (SMPMF) element,
        launching into the SMPMF element first light with a first vector of a first linear polarization substantially aligned along a slow axis of the SMPMF element and second light with a second vector of a second linear polarization substantially aligned along a fast axis of the SMPMF element to form first and second fundamental spatial fiber modes propagating in a fiber core of the SMPMF element; and
    interrupting said forming the substantially adiabatic optical fiber taper when an optical power parameter measured at an output of the SMPMF element is reduced below a pre-defined threshold as a result of said pulling, to form a tapered SMPMF element configured as said all-optical-fiber polarizer.

2. A method according to claim 1, further comprising:
    during said pulling the SMPMF element,
        spatially separating, at the output of the SMPMF element, first and second portions of output light transmitted through the SMPMF element and having the first and second linear polarizations; and
        with the use of respectively-corresponding first and second optical detection systems, spatially-independently monitoring first and second optical powers in the first and second portions of the output light; and
    wherein said interrupting includes ceasing the pulling when one of the first and second optical powers is reduced below the pre-defined threshold.

3. A method according to claim 2, wherein said one of the first and second optical powers is an optical power representing an optical fiber mode propagating in a cladding of the SMPMF element.

4. A method according to claim 3, wherein said interrupting includes ceasing the pulling at a moment when one of the first and second optical powers is reduced below the pre-defined threshold while the other of the first and second optical powers remains above the pre-defined threshold.

5. A method according to claim 2, wherein said interrupting includes ceasing the pulling at a moment when one of the first and second optical powers is reduced below the pre-defined threshold while the other of the first and second optical powers remains above the pre-defined threshold.

6. A method according to claim 5, wherein said other of the first and second optical powers is an optical power carried by an optical fiber mode propagating in the fiber core of the SMPMF element.

7. A method according to claim 5, wherein the launching includes:
   a) transmitting a first light output of a first laser light source through a first input SMPMF component that has a slow axis of the first input SMPMF component substantially-aligned, respectively, with the slow axis of the SMPMF element
   while transmitting a second light output of a second laser light source through a second input SMPMF component that has a fast axis of the second input SMPMF component substantially-aligned, respectively, with the fast axis of the SMPMF element; or
   b) splitting a light output of a laser source into a first light output and a second light output, and
   transmitting the first light output through a first input SMPMF component that has a slow axis of the first input SMPMF component substantially-aligned, respectively, with the slow axis of the SMPMF element
   while transmitting the second light output through a second input SMPMF component that has a fast axis of the second input SMPMF component substantially-aligned, respectively, with the fast axis of the SMPMF element.

8. A method according to claim 5, wherein the spatially-separating includes transmitting the output light through an output SMPMF component that includes spatially separated first and second auxiliary optical fibers.

9. A method according to claim 2, wherein the launching includes:
   a) transmitting a first light output of a first laser light source through a first input SMPMF component that has a slow axis of the first input SMPMF component substantially-aligned, respectively, with the slow axis of the SMPMF element
   while transmitting a second light output of a second laser light source through a second input SMPMF component that has a fast axis of the second input SMPMF component substantially-aligned, respectively, with the fast axis of the SMPMF element; or
   b) splitting a light output of a laser source into a first light output and a second light output, and
   transmitting the first light output through a first input SMPMF component that has a slow axis of the first input SMPMF component substantially-aligned, respectively, with the slow axis of the SMPMF element
   while transmitting the second light output through a second input SMPMF component that has a fast axis of the second input SMPMF component substantially-aligned, respectively, with the fast axis of the SMPMF element.

10. A method according to claim 2, wherein the spatially-separating includes transmitting the output light through an output SMPMF component.

11. A method according to claim 10, wherein said transmitting the output light through the output SMPMF component includes transmitting the output light through a first auxiliary optical fiber and a second auxiliary optical fiber towards a first optical detector and a second optical detector, respectively.

12. A method according to claim 1, wherein the launching includes:
   a) transmitting a first light output of a first laser light source through a first input SMPMF component that has a slow axis of the first input SMPMF component substantially-aligned, respectively, with the slow axis of the SMPMF element
   while transmitting a second light output of a second laser light source through a second input SMPMF component that has a fast axis of the second input SMPMF component substantially-aligned, respectively, with the fast axis of the SMPMF element; or
   b) splitting a light output of a laser source into a first light output and a second light output, and
   transmitting the first light output through a first input SMPMF component that has a slow axis of the first input SMPMF component substantially-aligned, respectively, with the slow axis of the SMPMF element
   while transmitting the second light output through a second input SMPMF component that has a fast axis of the second input SMPMF component substantially-aligned, respectively, with the fast axis of the SMPMF element.

13. A method according to claim 1, not including fusing first and second pieces of an optical fiber.

14. A method for aligning a polarization vector of light propagating through an all-optical-fiber system with a pre-determined axis, the method comprising:
   transmitting first light through the all optical-fiber system, in which the all-optical-fiber polarizer fabricated according to claim 1 has been inserted between and fused directly with first and second all-optical-fiber devices of the all-optical-fiber system,
   wherein one of slow and fast axes of the all-optical-fiber polarizer defines the pre-determined axis; and
   maximizing optical throughput produced by said first light at an output of the all-optical-fiber system.

* * * * *